United States Patent [19]

Bagdis

[11] 4,339,184
[45] Jul. 13, 1982

[54] DIGITAL SAMPLE AND HOLD WITH ROLLOVER INHIBIT

[75] Inventor: Judy Bagdis, Bradford, Mass.

[73] Assignee: Polaroid Corporation, Cambridge, Mass.

[21] Appl. No.: 213,415

[22] Filed: Dec. 5, 1980

[51] Int. Cl.³ .................. G03B 7/091; H03K 5/00
[52] U.S. Cl. .................................. 354/23 D; 354/32; 354/60 A; 307/526; 250/214 P; 235/92 V; 235/92 FQ; 235/92 CC; 235/92 PL; 235/92 CA
[58] Field of Search ............... 354/23 D, 29, 30, 27, 354/32–35, 50, 51, 60 A, 60 R, 139, 149; 307/352, 353, 525, 526; 328/151; 235/92 CC, 92 CA, 92 PL, 92 FQ, 92 V; 250/214 P

[56] References Cited

U.S. PATENT DOCUMENTS 3,727,526  4/1973  Hinds .................... 354/23 D
3,818,204  6/1974  Hadida ................... 235/92 C X
4,192,587  3/1980  LaRocque ............... 354/27

Primary Examiner—L. T. Hix
Assistant Examiner—William B. Perkey
Attorney, Agent, or Firm—Edward S. Roman

[57] ABSTRACT

An electronic circuit for sampling a digital pulse train signal and providing a replication in place thereof during a selected holding period includes a binary counter and register for counting and storing a clock pulse of substantially higher frequency than the sampled digital pulse train together with control gates for inhibiting the counter from rolling over in the event that the period of the sampled digital pulse train becomes so long that the maximum binary count capacity of the counter is reached. The sampled digital pulse train signal is preferably provided by the scene light detecting and integrating circuit of a photographic camera apparatus and the holding period during which the digital pulse train signal is substituted by the replicated signal corresponds to the flash fire duration of a strobe.

12 Claims, 5 Drawing Figures

DIGITAL SAMPLE AND HOLD WITH ROLLOVER INHIBIT

BACKGROUND OF THE INVENTION

1. Field of the Invention

This invention relates generally to an electronic circuit for sampling and holding a digital signal and, more particularly, to an electronic circuit for sampling a digital signal and for replicating the sampled digital signal during a select hold period.

2. Description of the Prior Art

Apparatus for sampling an analog electronic signal and for replicating the sampled analog signal during a selected hold period are well known in the art. Such apparatus may be utilized in photographic exposure control systems in a manner as is more fully described in U.S. Pat. No. 4,192,587, entitled "Proportional Fill Flash", by A. G. LaRocque et al., issued Mar. 11, 1980, in common assignment herewith, wherein the analog output signal from a scene light detecting and integrating circuit is continuously sampled during the exposure interval. The photographic apparatus utilizes a strobe as the primary source of illumination under conditions where the ambient scene light is low or as a source of fill-in illumination under conditions where the ambient scene light is high. Upon the firing of the strobe, it is preferred that the artificial scene light from the strobe not be detected and integrated by the scene light detecting and integrating circuit. Since it is physically impossible to block the artificial scene light from the strobe from reaching the scene light detecting photocell while simultaneously admitting the ambient scene light to the photocell, the analog output signal from the scene light detecting and integrating circuit must be blocked for the duration of the pulse of artificial light and a replicated signal substituted therefor representative of the analog signal at the instant immediately prior to the strobe ignition. Toward this end, there is provided a sample and hold circuit wherein the output analog signal from the scene light detecting and integrating means is continuously sampled until the firing of the strobe at which instant the sampled signal is held and substituted in place of the actual signal from the scene light detecting and integrating circuit for the duration of the strobe ignition time.

In some photographic exposure control systems, however, it has been found preferable to utilize a scene light detecting and integrating circuit which provides a digital type output signal instead of the analog output signal previously discussed. Such digital scene light detecting and integrating circuits may be of a type disclosed in U.S. Pat. No. 3,818,204, entitled "Voltage Integrating Apparatus", by R. Hadida, issued June 18, 1974. Sampling and holding a digital signal, however, is a substantially more complicated procedure than that required to sample and hold the aforementioned analog type signal and involves the use of digital type counters and registers which as a result of their finite counting capacity may rollover prematurely to provide an erroneous count under conditions where the period of the sampled digital signal becomes extremely long.

Therefore, it is a primary object of this invention to provide an electronic circuit for sampling a digital signal and for replicating the sampled digital signal during a selected hold period without incurring the risk of counters embodied therein rolling over.

It is a further object of this invention to provide a photographic exposure control system wherein the scene light is detected and integrated to provide a digital signal which is subsequently sampled with the sampled signal being substituted for the actual digital signal as a replication thereof during the flash fire time so as to effectively blank the detection and integration of the artificial light provided by the strobe.

Other objects of the invention will be in part obvious and will in part appear hereinafter. The invention accordingly comprises a mechanism and system possessing a construction, combination of elements and arrangement of parts which are exemplified in the following detailed disclosure.

SUMMARY OF THE INVENTION

An electrical circuit for sampling a digital pulse train signal and providing a replication thereof during a select holding period comprises means for counting a clock pulse of substantially higher frequency than the digital pulse train signal and for providing a binary count output signal representative of the clock pulse so counted. The counting means also resets to a zero count in response to each pulse in the digital pulse train signal. Means are provided which respond to the digital pulse train signal to receive the binary count output signal from the counting means immediately prior to each succeeding reset of the counting means to zero and for storing each of the received binary count signals until the next succeeding binary count output signal is received from the counting means. Means respond to a hold signal for comparing the binary count signal stored in the receiving and storing means with the binary count signal from the counting means to provide an output pulse each time the binary count signal stored in the storing means matches the binary count signal from the counting means thereby replicating the pulse train signal existent immediately prior to the hold signal. The comparing means further includes means for providing a signal to reset the counting means to zero each time the binary count signal stored in the receiving and storing means matches the binary count output signal from the counting means. Means also respond to the counting means counting up to its maximum binary count before being reset to a zero count in response to a pulse from the digital pulse train signal to inhibit further counting by the counting means which would result in the counting means otherwise rolling over back to a zero count. The rollover inhibiting means further includes means for signalling the receiving and storing means to receive and store the binary count output signal from the counting means as the binary count output signal approaches its maximum count.

In the preferred mode, the digital pulse train signal is provided by a digital type scene light detecting and integrating circuit in a photographic apparatus, and the hold signal is provided upon the firing of a strobe and lasts for the duration of the strobe ignition time until the extinguishment of the artificial light provided by the strobe.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENTS

Figure 1:
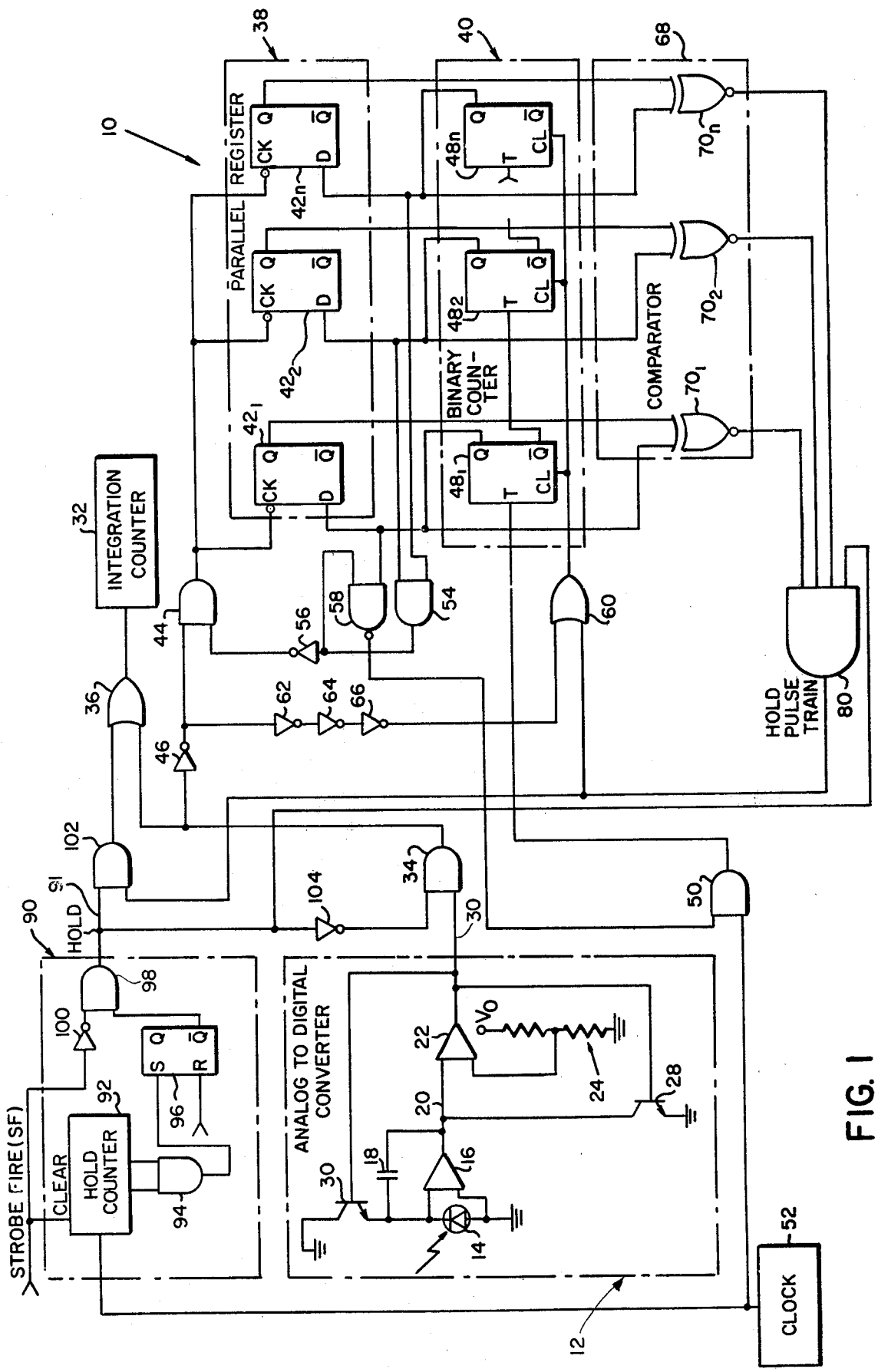
FIG. 1 is an electrical circuit diagram of the electronic circuit of this invention.

Referring now to FIG. 1, there is shown generally at 10 the sample and hold circuit of this invention which may be used in conjunction with an analog-to-digital converter as shown generally at 12. In the preferred mode, the analog-to-digital converter 12 is connected to convert the analog output signal from a light integrating circuit 13 to a digital output signal in a manner to be herein described. The light integrating circuit 13 comprises a photoresponsive element 14 preferably stationed in a photograhic apparatus to detect scene light for the purpose of controlling a photographic exposure operation in a manner as is fully described in U.S. Pat. No. 4,192,587, entitled "Proportional Fill Flash", by A. LaRocque et al., issued Mar. 11, 1980, in common assignment herewith and now incorporated by reference herein.

The photoresponsive element 14 is connected across the input terminals of an operational amplifier 16 of the differential variety. When considered ideally, the amplifier 16 has an infinite gain and an infinite input impedance and a zero output impedance. The input circuit of amplifier 16, however, is structured such that the apparent input impedance for the photoresponsive element 14 is substantially zero, thereby functioning in a manner which permits the photoresponsive element 14 to operate in a current mode. Consequently, the current generated by the photoresponsive element 14 is limited substantially only to its own internal impedance. To accomplish this effect, a feedback integration capacitor 18 is connected between one input terminal 19 of the operational amplifier 16 and an output terminal 20 from the operational amplifier 16.

With the integration feedback arrangement herein described, any difference of potential supplied by the photoresponsive element 14 to the input terminals of the operational amplifier 16 will operate to cause a current of opposite polarity to be produced through feedback integration capacitor 18. As a consequence, the feedback integration capacitor 18 provides a substantially instantaneous feedback signal of opposite polarity which serves to counteract any differential signal voltage impressed by the photoresponsive element 14 across the input terminal to the operational amplifier 16. Thus, although the amplifier 16 has a very high input impedance, the photoresponsive element 14 when connected in the aforementioned manner, experiences a very low input impedance to the amplifier 16. Therefore, the current output of the photoresponsive element 14 is directed into the feedback integration capacitor 18. In this manner, the photoresponsive element 14 is connected to operate in a constant current mode of operation under conditions of non-varying scene light intensity to provide a substantially linear output response at output terminal 20 as is more fully described in U.S. Pat. No. 3,620,143, entitled "Automatic Exposure Control System with Fast Linear Response", by J. Burgarella, issued Nov. 16, 1971, in common assignment herewith and now incorporated by reference herein in its entirety.

Figure 2:
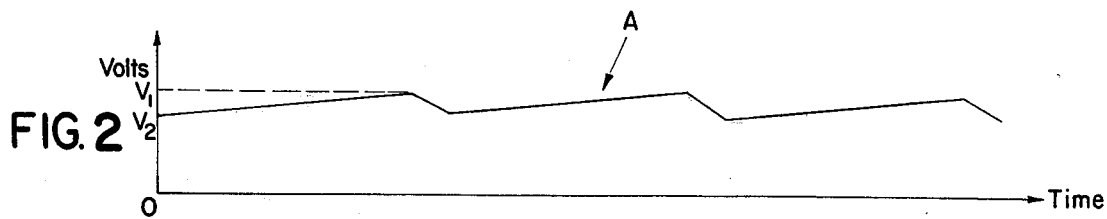
FIG. 2 is a graphical representation of an electrical signal wave form at one point in the circuit of FIG. 1.

In response to incident light to the photoresponsive element 14, the light integrating circuit 13 provides an integrated analog output response at output line 20 which is directed to an input terminal of a comparator 22 which operates to compare the integrated output voltage signal level along line 20 with a select reference signal level as derived from a voltage divider circuit shown generally at 24. When the output voltage signal level from the integrating circuit 13 along output line 20 reaches a selected reference voltage signal level $V_1$ (see FIG. 2) along line 26, the comparator 22 switches from a low (binary logic 0) output signal level to a high (binary logic 1) output signal level along output line 30 to drive an NPN transistor 28 into saturation and thereby discharge the feedback integration capacitor 18. Additionally, an NPN transistor 30 connected in reverse operating mode is simultaneously turned on to divert current from the photoresponsive element 14. The output signal level from the integrating circuit 13 discharges to a selected voltage value $V_2$ below the selected reference level $V_1$ as shown in FIG. 2, whereupon the comparator 22 switches back to provide a low (binary logic 0) output signal level to turn on the transistors 28 and 30 allowing the integration circuit to resume integrating back to the selected reference voltage signal level $V_1$. The comparator 22 and light integrating circuit 13 continue to cycle in the aforementioned manner between the reference voltages $V_1$ and $V_2$ as a result of the hysteresis associated with the comparator 22 to provide a saw tooth output signal A along line 20 as shown in FIG. 2.

Figure 3:
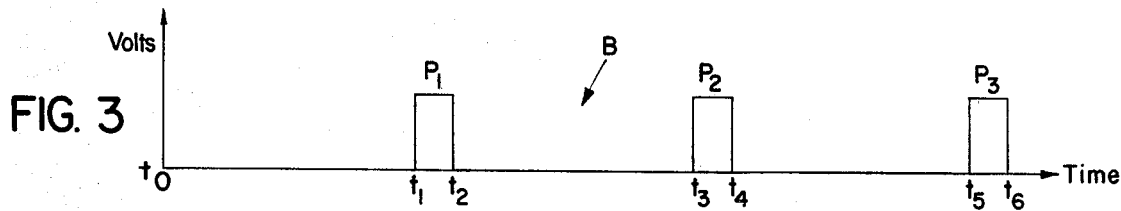
FIG. 3 is a graphical representation of an electrical signal wave form at another point in the circuit of FIG. 1.

The output signal from the comparator 22 at line 30 approximates a digital pulse train B as shown in FIG. 3 comprising a plurality of periodically spaced apart pulses $P_1$, $P_2$, etc. and is thereafter directed by way of an AND gate 34 and an OR gate 36 to an integration counter 32 which ultimately provides exposure influencing control signals based upon the total number of pulses counted in a manner as is again more fully described in U.S. Pat. No. 4,192,587, supra.

The digital pulse train output signal B from the analog-to-digital converter 12 is continuously sampled by a parallel register as shown generally at 38 and a binary counter as shown generally at 40. The parallel register 38 comprises a plurality of D-type flip-flops as shown at $42_1$ through $42_n$. The flip-flops $42_1$ through $42_n$ are all simultaneously clocked by way of the output signal from an AND gate 44, one input terminal of which receives the output signal from the AND gate 34 by way of an inverter gate 46.

Figure 5:
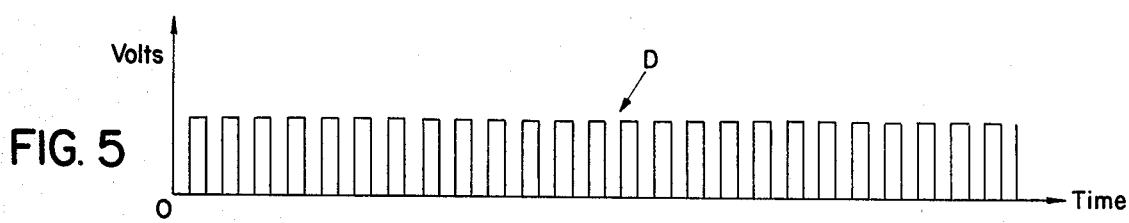
FIG. 5 is a graphical representation of an electrical wave form at still another point in the circuit of FIG. 1.

The binary counter 40 comprises a plurality of toggle-type flip-flops $48_1$ through $48_n$ serially connected in a well-known manner to count an output clock pulse received from a clock 52 by way of an AND gate 50. The output clock pulse from the clock 52 is shown at D in FIG. 5 and can be seen to be of substantially higher frequency than the output pulse train signal B from the analog-to-digital converter 12. The binary output signal levels at the Q terminals of the flip-flops $48_1$ through $48_n$ are directed respectively to D input terminals of corresponding flip-flops $42_1$ through $42_n$. In addition the output signals from the Q terminals of the flip-flops $48_2$ through $48_n$ are directed to the input terminals of an AND gate 54. The output signal from the AND gate 54 is thereafter inverted by an inverter gate 56 and directed to the other input terminal of the AND gate 44. The output signal from the Q terminal of the flip-flop $48_1$ is also directed to one input terminal of a NAND gate 58 with the other input terminal thereto connected to receive the output signal from the AND gate 54 to inhibit the rollover of the binary counter 40 in the manner of this invention to be subsequently described herein. The output from the NAND gate 58 is thereafter directed to the other input terminal of the AND gate 50. The clear terminals of the flip-flops $48_1$ through $48_n$ are in common connection with respect to each other and receive an output signal from an OR gate 60, one input terminal of which receives a thrice inverted output signal from the inverter 46 by way of three serially connected inverter gates 62, 64 and 66.

The output digital pulse train B from the analog-to-digital converter 12 at output line 30 is sampled in the following manner. The AND gate 34 is enabled in a manner to be subsequently described to transmit the digital pulse train B from the digital-to-analog converter 12 to one input terminal of the OR gate 36. The other input terminal to the OR gate 36 receives a low (binary logic 0) input signal level for reasons which will also become apparent from the following discussion, and thus the OR gate 36 operates to transmit the digital pulse train B to the integration counter 32.

Referring now to the digital pulse train B of FIG. 3, it can be seen that during the interval from $T_0$-$T_1$ prior to the first pulse $P_1$ in the pulse train B, there is provided a low (binary logic 0) output signal level from the AND gate 34 which is subsequently inverted by the inverter 46 to provide a high (binary logic 1) input signal level to one input terminal of the AND gate 44. The other input terminal to the AND gate 44 is already at a high (binary logic 1) input signal level for reasons which will become apparent from the following discussion, and thus the AND gate 44 provides a high (binary logic 1) input signal level to the clock terminals of the flip-flops $42_1$ through $42_n$. The high (binary logic 1) output signal level from the inverter 46 is subsequently thrice inverted by the serially connected inverters 62, 64 and 66 to provide a low (binary logic 0) signal level to one input terminal of the OR gate 60. The other input terminal to the OR gate 60 is also at a low (binary logic 0) signal level for reasons which will become apparent from the following discussion. Thus, the OR gate 60 provides a low (binary logic 0) signal level to the clear terminals of the flip-flops $48_1$ through $48_n$ so as to enable the binary counter 40 to count the clock pulse D received from the clock 52 by way of the AND gate 50.

The leading edge at $T_1$ of the first pulse $P_1$ of the digital pulse train B as shown in FIG. 3 operates to gate the AND gate 34 to provide a high (binary logic 1) output signal level which is subsequently inverted by the inverter 46 so as to provide a low (binary logic 0) input signal level to one input terminal of the AND gate 44. The AND gate 44 is thereby gated to provide a low (binary logic 0) output signal level to the clock terminals of the flip-flops $42_1$ through $42_n$ so as to shift or clock in the output binary signal levels from the Q terminals from flip-flops $48_1$ through $48_n$ of the binary counter 40 respectively into the corresponding flip-flops $42_1$ through $42_n$ of the parallel register 38. Thus, the Q terminals of the flip-flops $42_1$ through $42_n$ of the parallel register 38 are clocked to assume the same respective binary signal levels as the Q terminals of the corresponding flip-flops $48_1$ through $48_n$ of the binary counter 40. In this manner, the binary count of the counter 40 is shifted to the parallel register 38.

The inverted leading edge of the pulse $P_1$ of the digital pulse train B is thereafter thrice inverted by the inverters 62, 64 and 66 to provide a positive (binary logic 1) input signal to one input terminal of the OR gate 60 thereby switching the output therefrom to a high (binary logic 1) output signal level which is directed to all the clear terminals of the flip-flops $48_1$ through $48_n$ so as to clear and reset the counter 40. In this manner, all the output signal levels from the Q terminals of flip-flops $48_1$ through $48_n$ are reset to a low (binary logic 0) output signal level.

The trailing edge at $T_2$ of the first pulse $P_1$ of the digital pulse train B from the analog-to-digital converter 12, operates to gate the AND gate 34 back to provide a low (binary logic 0) output signal level which is subsequently inverted by the inverter gate 46 to provide a high (binary logic 1) output signal level to one input terminal of the AND gate 44. The AND gate 44 thus switches to provide a high (binary logic 1) output signal level to the clock terminals of the flip-flops $42_1$ through $42_n$ of the parallel register 38. The high (binary logic 1) output signal level from the inverter 46 is thereafter thrice inverted by the inverters 62, 64 and 66 to provide a low (binary logic 0) input signal level to the OR gate 60 so as to switch the output from the OR gate 60 to a low (binary logic 0) signal level which enables the binary counter 40 to start counting the clock pulse D from the clock 52. As previously discussed, the clock pulse D is of substantially higher frequency than the digital pulse train B from the analog-to-digital converter 12 thereby allowing the binary counter 40 to count up a plurality of clock pulses before the second pulse $P_2$ in the digital pulse train B is provided by the analog-to-digital converter 12.

Figure 4:
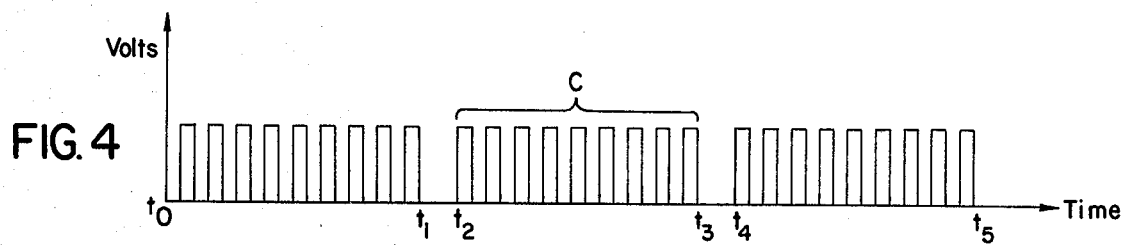
FIG. 4 is a graphical representation of an electrical signal wave form at still another point in the circuit of FIG. 1.

The second pulse $P_2$ of the digital pulse train B operates in the aforementioned manner to gate the AND gate 34 to provide a high (binary logic 1) output signal level which is subsequently inverted by the inverter 46 to provide a low (binary logic 0) output signal level to the AND gate 44. The AND gate 44, in turn, is gated to provide a low (binary logic 0) output signal level to the clock terminals of the flip-flops $42_1$ through $42_n$ thereby shifting or clocking the pulse count from the binary counter 40 into the register 38 in the aforementioned manner. Thus, the binary count of the counter 40 immediately prior to the leading edge of the second pulse $P_2$ of the digital pulse train B which represents the number of clock pulses from the clock 52 counted in the period ($T_3$-$T_2$) between the first pulse $P_1$ and the second pulse $P_2$ of the digital pulse train B as shown at C in FIG. 4 is transferred and stored in the register 38 for the next succeeding period ($T_5$-$T_4$) between the second pulse $P_2$ and the third pulse $P_3$ of the digital pulse train B.

The leading edge at $T_3$ of the second pulse $P_2$ of the digital pulse train B gates the AND gate 34 to provide a positive (binary logic 1) output signal level which is inverted by the inverter 46 and thereafter thrice inverted by the inverters 62, 64 and 66 to provide a high (binary logic 1) input signal level to the OR gate 60 so as to switch the OR gate 60 and provide a high (binary logic 1) input signal level to the clear terminals of the flip-flops $48_1$ through $48_n$ of the binary counter 40. In this manner, the pulse count from the binary counter 40 is again cleared to enable the binary counter 40 to again start counting the clock pulse D from the clock 52 at the trailing edge ($T_4$) of the second pulse $P_2$ from the pulse train.

Thus, as is now readily apparent, the binary counter 40 will operate to count the clock pulse from the clock 52 in the period ($T_5$-$T_4$) between the second pulse $P_2$ and the third pulse $P_3$ of the digital pulse train B from the analog-to-digital converter 12 while the register 38 stores the pulse count C (FIG. 4) previously counted by the binary counter 40 during the period ($T_3$-$T_2$) between the first pulse $P_1$ and the second pulse $P_2$ of the digital pulse train B. Each succeeding pulse in the digital pulse train B operates to first clock in or shift the count from the binary counter 40 to the register 38 and to thereafter clear the counter 40 back to a zero count. This sequence is made possible by the inverter gates 46, 62, 64 and 66 since the leading edge of each succeeding pulse in the digital pulse train B from the analog-to-digital converter 12 is first directed to the parallel register 38 to clock in or shift the output count from the binary counter 40 into the register 38 and is thereafter directed by virtue of the delay provided by the inverters 62, 64 and 66 to clear the counter 40 back to a zero count subsequent to the output therefrom being clocked into or shifted to the register 38. In this manner, the output digital pulse train B from the analog-to-digital converter 12 is continuously sampled with the parallel register 38 providing a binary clock pulse count indicative of the frequency and period of the digital pulse train B immediately preceding each succeeding pulse in the digital pulse train B.

Under certain conditions as more fully described in U.S. Pat. No. 4,192,587, supra., it may become necessary to inhibit or hold for a limited period of time the digital pulse train B from being counted by the integration counter 32 and to substitute therefor a pulse train which replicates the frequency and period of the digital pulse train B from the analog-to-digital converter 12 at the instant immediately preceding the command to hold. The command to hold the digital pulse train B from the analog-to-digital converter 12 in a photographic camera apparatus may occur as a result of firing an electronic flash or strobe in order to blank the integration of the strobe light for reasons again as is more fully described in U.S. Pat. No. 4,192,587.

Thus, prior to the strobe being fired, there may be provided a positive (binary logic 1) input signal level to a strobe fire input signal line (SF) which inputs to a hold signal circuit as shown generally at 90. The positive (binary logic 1) input signal level to the strobe fire input signal line previous to the strobe being fired operates to clear a hold counter 92 so as to maintain a zero binary output count therefrom. The high (binary logic 1) input signal level to the strobe fire input signal line previous to the strobe being fired is also inverted by an inverter gate 100 to provide a low (binary logic 0) input signal level to an AND gate 98 which, in turn, provides a low (binary logic 0) hold signal at output line 91. The low (binary logic 0) hold signal from the AND gate 98 at output line 91 is thereafter directed to an input terminal of an AND gate 102 and to an inverter gate 104 so as to provide an enabling high (binary logic 1) input signal level to the AND gate 34. The low (binary logic 0) output hold signal from the hold signal circuit 90 is also directed to one input terminal of an AND gate 80 so as to disable the AND gate 80 which receives a plurality of other input signals from a plurality of exclusive NOR gates $70_1$ through $70_n$ in a comparator circuit as shown generally at 68.

The strobe fire command signal operates to provide a low (binary logic 0) input signal level to the strobe fire line (SF) to the hold signal circuit 90 so as to enable the hold counter 92 to start counting and the AND gate 98 to switch to a high (binary logic 1) output signal level since its other input terminal already receives a high (binary logic 1) output signal level from the $\overline{Q}$ terminal of an RS flip-flop 96. The high (binary logic 1) output hold signal level from the hold signal circuit 90 at output line 91 is thereafter inverted by the inverter 104 to disable the AND gate 34 and inhibit the digital pulse train B from being transmitted to the integration counter 32. The high (binary logic 1) output hold signal level is also directed to one input terminal of the AND gate 80 so as to enable the AND gate 80 to transmit a hold pulse train signal in the following manner.

As is readily apparent, inhibiting the transmission of the digital pulse train B from the analog-to-digital converter 12 by way of the AND gate 34 also operates to inhibit the subsequent transfer or clocking in of the binary clock pulse count from the binary counter 40 to the parallel register 38. However, the binary counter 40 continues to count the clock pulse D from the clock 52 while the comparator 68 operates to compare the output signal levels at respective Q output terminals from corresponding flip-flops in the parallel register 38 and the binary counter 40 with each exclusive NOR gate $70_1$ through $70_n$ switching to provide a high (binary logic 1) output signal level upon detecting matched output signal levels from respective Q output terminals of corresponding flip-flops $42_1$ through $42_n$ and $48_1$ through $48_n$. Thus, when the count from the binary counter 40 matches the count stored by the register 38, all the exclusive NOR gates $70_1$ through $70_n$ provide a high (binary logic 1) output signal level to switch the AND gate 80 to provide a high (binary logic 1) hold pulse train signal level which is thereafter directed to the AND gate 102 for transmission to the integration counter 32 by way of the OR gate 36. The hold clock output signal level from the AND gate 80 is also simultaneously directed to an input terminal from the OR gate 60 which transmits the high (binary logic 1) signal level to the clear terminals of the flip-flops $48_1$ through $48_n$ to clear the binary counter 40 and return the output count therefrom back to zero. Clearing the binary counter 40 removes the matched condition between respective Q terminals of corresponding flip-flops $42_1$ through $42_n$ and $48_1$ through $48_n$ so as to switch at least one of the exclusive NOR gates $70_1$ through $70_n$ back to a low (binary logic 0) output signal level thereby switching the output from the AND gate 80 to a low (binary logic 0) output signal level and, in turn, switching the output from the AND gate 102 back to a low (binary logic 0) output signal level.

Thus, the mode of operation for the binary counter 40 is now such that it continuously counts the clock pulse D from the clock 52 until reaching a binary output count which matches the binary output count stored by the register 38 at which instant the AND gate 80 is signalled to provide a hold clock pulse which, in turn, resets the counter 40 back to its zero count. The count is repeated with each succeeding hold pulse operating to provide the hold pulse train which replicates the digital pulse train B previously provided by the analog-to-digital converter 12 immediately prior to the strobe fire command signal. In this manner, the integration counter 32 receives the hold pulse train constructed by the comparator 68 at the identical frequency and period as the digital pulse train B previously sampled and stored by the register 38 immediately prior to the strobe fire command signal.

For reasons which are more fully discussed in U.S. Pat. No. 4,192,587, it may be desirable to hold or inhibit the digital pulse train B from the integration counter 32 and to substitute the hold pulse train therefor only for the duration of the strobe flash time which may be in the order of 1.2 milliseconds. Toward this end, the hold counter 92 counts the clock pulse D from the clock 52 and is decoded by an AND gate 94 at 1.2 milliseconds subsequent to the receipt of the strobe fire command signal. The AND gate 94 thereafter operates to set the flip-flop 96 so that the $\bar{Q}$ terminal thereof provides a low (binary logic 0) output signal level to disable the AND gate 98 and return the hold signal level at output line 91 back to a low (binary logic 0). The low (binary logic 0) output signal level from the hold signal circuit 90 at line 91 thereafter disables the AND gate 80 and is inverted by the inverter 104 to enable the AND gate 34 to again transmit the digital pulse train B from the analog-to-digital converter 12 to the integration counter 32 by way of the OR gate 36. The comparator 68 is thus disabled from further providing a hold pulse train signal to the integration counter 32, and the binary counter 40 and parallel register 38 continue to sample the digital pulse train B from the analog-to-digital converter 12 in the aforementioned manner.

Under conditions of extremely low ambient scene light intensity, it is possible that the period ($T_3$-$T_2$, $T_5$-$T_4$, etc.) between pulses in the digital pulse train B will be so long that the binary counter 40 will count to its maximum count and thereafter rollover and start counting again from zero before being reset by the next succeeding pulse in the digital pulse train B. Under these circumstances the binary clock pulse D count clocked into and stored by the parallel register 38 would no longer be representative of the actual frequency and period of the digital pulse train B. In fact, the lower clock pulse D count stored by the register 38 would be indicative of a much higher frequency digital pulse train B than actually exists.

Toward this end, the means of this invention are provided to inhibit the binary counter 40 from rolling over upon reaching its maximum count thereby providing a clock pulse D count more nearly representative of the actual frequency of the digital pulse train B. Thus, when all the flip-flops $48_2$ through $48_n$ excepting the first flip-flop $48_1$ of the binary counter 40 are toggled to provide high (binary logic 1) output signal levels at their Q terminals, the AND gate 54 triggers to provide a high (binary logic 1) output signal level. The output from the AND gate 54 is thereafter inverted by an inverter 56 to provide a low (binary logic 0) input signal to the AND gate 44 so as to switch the output therefrom to a low (binary logic 0) signal level to clock in or shift into the flip-flops $42_1$ through $42_n$ of register 38, the binary clock pulse D count from the counter 40, which is the maximum count that can be stored in the register 38.

The subsequent count of one more additional pulse from the clock pulse D to toggle the flip-flop $48_1$ to switch the output from the Q terminal thereof to a high (binary logic 1) output signal level operates to switch the NAND gate 58 to provide a low (binary logic 0) output signal level which disables the AND gate 50 from transmitting the clock pulse 52 to the binary counter 40.

In the event now that the strobe should be commanded to fire prior to receipt of the next succeeding pulse in the digital pulse train B, there will be provided the hold signal at the output line 91 from the hold signal circuit 90 to disable the AND gate 34 from further transmitting the digital pulse train B from the analog-to-digital converter 12 to the integration counter 32. However, as is readily apparent, the binary counter 40 also is disabled from counting the clock pulse from the clock 52 by virtue of the low (binary logic 0) output signal level from the NAND gate 58 to one input terminal of the AND gate 50. Thus, with the counter 40 disabled in this manner, a match condition can never be achieved between the output signal levels from respective Q terminals of corresponding flip-flops $42_1$ through $42_n$ and $48_1$ through $48_n$ in the parallel register 38 and counter 40; and, therefore, the hold pulse train will not be provided to the integration counter 32. However, since the holding period is relatively short in the order of 1.2 milliseconds and the period between pulses of the digital pulse train B from the analog-to-digital converter 12 relatively long approximating the order of 1.2 milliseconds, there will be provided a minimum error in the integration count to the integration counter 32 which under the worst case condition might miss only a single pulse count.

Under the aforementioned circumstances, if the next succeeding pulse from the digital pulse train B is provided prior to the strobe fire command signal, then that pulse will be transmitted by way of the AND gate 34, inverters 46, 62, 64 and 66 and OR gate 60 to reset the binary counter 40 back to its initial zero count condition thereby, in turn, gating the AND gate 54 back to a low (binary logic 0) output signal level and NAND gate 58 back to a high (binary logic 1) output signal level to enable the AND gate 50 and allow the binary counter 40 to resume counting the clock pulse D. If the strobe fire command signal is provided next prior to the emergence of the second succeeding pulse in the digital pulse train B, the binary counter 40 will continue to count the clock pulse D from the clock 52 in the aforementioned manner until reaching the same count previously stored in the register 38 which as already discussed is the maximum count that can be stored in the register 38. The exclusive NOR gates $70_1$ through $70_n$ in the comparator 68 will switch to provide a hold pulse to the integration counter 32. During the 1.2 millisecond preferred holding period, only one hold pulse will be provided to the integration counter 32 since the register 38 stored the maximum binary clock pulse D count. Thus, as should now be readily apparent, the binary counter 40 and register 38 are preferably provided with the minimum number of flip-flops which can be entirely filled up in the preferred holding time which in this example is approximately 1.2 milliseconds under conditions of low ambient scene light intensity which provides for a low frequency digital pulse train B.

Although the analog-to-digital converter 12 has been described in relation to a photographic scene light detecting and integrating circuit, the scope of this invention is by no means so limited and would be equally applicable to analog-to-digital converters used in other arrangements. In addition, as is readily apparent, although the hold signal is precipitated as a function of a strobe fire command signal, the scope of this invention is by no means so limited. Therefore, other embodiments of the invention, including additions, subtractions, deletions, and other modifications of the preferred disclosed embodiments of the invention will be obvious to those skilled in the art and are within the scope of the following claims.

What is claimed is:

1. An electrical circuit for sampling a digital pulse train signal and providing a replication thereof during a select holding period comprising:

means for counting a clock pulse of substantially higher frequency than the digital pulse train signal and for providing a binary count output signal representative of the pulses of said clock pulse so counted, said counting means also resetting to a zero count in response to each pulse in the digital pulse train signal;

means responsive to the digital pulse train signal for receiving said binary count output signal from said counting means immediately prior to each succeeding reset of said counting means to zero and for storing each of said received binary count signals until the next succeeding binary count output signal is received from said counting means;

means responsive to a hold signal for comparing the binary count signal stored in said receiving and storing means with the binary count output signal from said counting means and for providing an output pulse each time the binary count signal stored in said storing means matches the binary count output signal from said counting means thereby replicating the pulse train signal existent immediately prior to the hold signal, said comparing means further including means for providing a signal to reset said counting means to zero each time said binary count signal stored in said receiving and storing means matches the binary count output signal from said counting means; and means responsive to said counting means counting up to its maximum binary count before being reset to a zero count in response to a pulse from the digital pulse train signal for inhibiting further counting by said counting means which would result in said counting means otherwise rolling over back to a zero count, said rollover inhibiting means further including means for signalling said receiving and storing means to receive and store said binary count output signal from said counting means as said binary count output signal approaches its maximum count.

2. The circuit of claim 1 wherein said rollover inhibiting means responds to the resetting of said counting means back to a zero count in response to a pulse from the digital pulse train signal received subsequent to the inhibiting of said counting means by enabling said counter to again count the pulses of said clock pulse.

3. The circuit of claim 1 or 2 wherein said counting means comprises a plurality of toggle flip-flops serially connected to function in the manner of a binary counter and wherein said rollover inhibiting means comprises a first gate responsive to all except the first of said serially connected toggle flip-flops being switched to provide high binary output signal levels, for signalling said receiving and storing means to receive and store said binary count output signal from said counting means.

4. The circuit of claim 3 wherein said rollover inhibiting means comprises a second gate responsive to all of said serially connected toggle flip-flops being switched to provide high binary output signal levels, for inhibiting said clock pulse from reaching said binary counter.

5. In a photographic camera apparatus of the type having means for detecting and integrating scene light to provide an analog integration signal, means for converting the analog integration signal to a digital signal comprising a digital pulse train, means for counting the individual pulses in the digital pulse train to provide an exposure controlling signal in response to the number of pulses so counted, and means for providing a flash fire signal, there is also included means for sampling the digital pulse train signal and providing a replication thereof during the period of flash ignition comprising:

means for counting a clock pulse of substantially higher frequency than the digital pulse train signal and for providing a binary count output signal representative of the pulses of said clock pulse so counted, said counting means also resetting to a zero count in response to each pulse in the digital pulse train signal;

means responsive to the digital pulse train signal for receiving said binary count output signal from said counting means immediately prior to each succeeding reset of said counting means to zero and for storing each of said received binary count signals until the next succeeding binary count output signal is received from said counting means;

means responsive to the flash fire signal for providing a hold signal of determinate duration corresponding generally to the anticipated time between the firing of the flash and the subsequent extinguishment of the flash light;

means responsive to said hold signal for comparing the binary count signal stored in said receiving and storing means with the binary count output signal from said counting means and for providing an output pulse each time the binary count signal stored in said storing means matches the binary count output signal from said counting means thereby replicating the pulse train signal existent immediately prior to the flash fire signal, said comparing means further including means for providing a signal to reset said counting means to zero each time said binary count signal stored in said receiving and storing means matches the binary count output signal from said counting means;

means responsive to said hold signal for blocking the transmission of the digital pulse train signal from the analog-to-digital converting means to the exposure controlling signal counter while simultaneously allowing transmission of the replicated pulse train signal from the comparing means to the exposure controlling signal counter; and means responsive to said counting means counting up to its maximum binary count before being reset to a zero count in response to a pulse train from the digital pulse train signal for inhibiting further counting by said counting means which would result in said counting means otherwise rolling over back to a zero count, said rollover inhibiting means further including means for signalling said receiving and storing means to receive and store said binary count output signal from said counting means as said binary count output signal approaches its maximum count.

6. The circuit of claim 5 wherein said rollover inhibiting means responds to the resetting of said counting means back to a zero count in response to a pulse from the digital pulse train signal received subsequent to the inhibiting of said counting means by enabling said counter to again count the pulses of said clock pulse.

7. The circuit of claim 5 or 6 wherein said counting means comprises a plurality of toggle flip-flops serially connected to function in the manner of a binary counter and wherein said rollover inhibiting means comprises a firt gate responsive to all except the first of said serially connected toggle flip-flops being switched to provide high binary output signal levels, for signalling said receiving and storing means to receive and store said binary count output signal from said counting means.

8. The circuit of claim 7 wherein said rollover inhibiting means comprises a second gate responsive to all of said serially connected toggle flip-flops being switched to provide high binary output signal levels, for inhibiting said clock pulse from reaching said binary counter.

9. In an electronic system for continuously sampling a digital pulse train and providing a replication thereof during a select holding period including: means for counting a clock pulse of substantially higher frequency than the digital pulse train signal and for providing a binary count output signal representative of the pulses of the clock pulse so counted, the counting means also resetting to a zero count in response to each pulse in the digital pulse train signal; means responsive to the digital pulse train signal for receiving the binary count output signal from the counting means immediately prior to each succeeding reset of the counting means and for storing each of the received binary count signals until the next succeeding binary count output signal is received from the counting means; means responsive to a hold signal for comparing the binary count signal stored in the receiving and storing means with the binary count output signal from the counting means and for providing an output pulse each time the binary count signal stored in the storing means matches the binary count output signal from the counting means thereby replicating the pulse train signal existent immediately prior to the hold signal, the comparing means further including means for providing a signal to reset the counting means to zero each time the binary count signal stored in the receiving and storing means matches the binary count output signal from the counting means, the improvement comprising:

means responsive to the counting means counting up to its maximum binary count before being reset to the zero count in response to a pulse from the digital pulse train signal for inhibiting further counting by the counting means which would result in the counting means otherwise rolling over back to the zero count, said rollover inhibiting means further including means for signalling the receiving and storing means to receive and store the binary count output signal from the counting means as the binary count output signal approaches its maximum count.

10. The improvement of claim 9 wherein said rollover inhibiting means responds to the resetting of the counting means back to the zero count in response to a pulse from the digital pulse train signal received subsequent to the inhibiting of the counting means by enabling the counter to again count the pulses of the clock pulse.

11. The improvement of claim 9 or 10 wherein the counting means comprises a plurality of toggle flip-flops serially connected to function in the manner of a binary counter and wherein said rollover inhibiting means comprises a first gate responsive to all except the first of the serially connected toggle flip-flops being switched to provide high binary output signal levels, for signalling the receiving and storing means to receive and store the binary count output signal from the counting means.

12. The improvement of claim 11 wherein said rollover inhibiting means comprises a second gate responsive to all of the serially connected toggle flip-flops being switched to provide high binary output signal levels for inhibiting the clock pulse from reaching the binary counter.

* * * * *